UNITED STATES PATENT OFFICE.

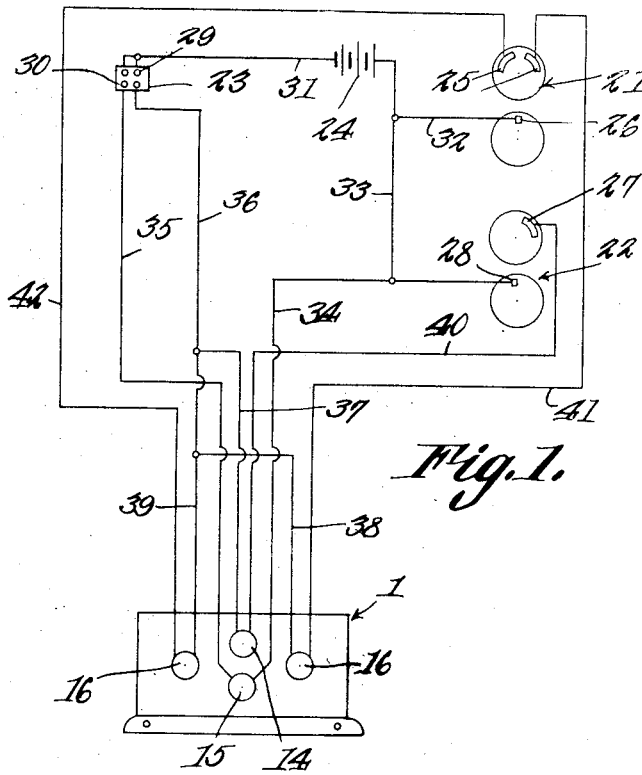

VARR M. GRUMMONS, OF FORT WAYNE, INDIANA.

ELECTRIC VEHICLE-SIGNAL SWITCH.

1,245,707.  Specification of Letters Patent.  Patented Nov. 6, 1917.

Application filed February 2, 1917. Serial No. 146,222.

*To all whom it may concern:*

Be it known that I, VARR M. GRUMMONS, a citizen of the United States, residing at Fort Wayne, in the county of Allen and State of Indiana, have invented a new and useful Electric Vehicle-Signal Switch, of which the following is a specification.

The present invention appertains generally to switches for signals and semaphores, and aims to provide a novel and improved device of that character adapted especially for use upon automobiles, motorcycles, trucks, motor boats, launches and other vehicles, and controlling the circuits of signal and tail light lamps.

The object of the invention is the provision of a simple and inexpensive controlling switch of novel construction.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a diagrammatical view of the apparatus.

Fig. 2 is a front view of one of the controlling switches connected to the brake pedal for automatic operation.

Fig. 3 is a section on the line 3—3 of Fig. 2.

Fig. 4 is a sectional detail taken on the line 4—4 of Fig. 3.

Fig. 5 is a view similar to Fig. 2 illustrating the other controlling switch connected to the steering gear to be operated automatically.

The signal device 1 embodies electric lamps 14, 15 and 16.

The electrical system as depicted in Fig. 1, embodies a controlling switch 21 for the lamps 16, a controlling switch 22 for the lamp 14, a switch 23 for opening and closing the tail light and signal circuits, and battery or other source of electrical energy 24. The switch 21 has arcuate contact strips 25 and a movable contact 26 normally between the strips 25 out of engagement therewith and movable into engagement with either of said strips when the contact 26 is oscillated in one direction or the other. The switch 22 embodies an arcuate contact strip 27 and a movable contact 28 movable into and out of engagement with the strip 27. The switch 23 has buttons 29 for opening and closing the signal circuit, and buttons 30 for opening and closing the tail light circuit. A conductor 31 connects one pole of the battery 24 with the switch 23, and the other pole of the battery is connected by a conductor 32 with the contact 26, by a conductor 33 with the contact 28, and by a conductor 34 with one terminal of the tail light lamp 15. The switch 23 is connected by a conductor 35 with the other terminal of the lamp 15, thereby completing the tail light circuit including the battery 24, conductor 31, switch 23, conductor 35, lamp 15 and conductor 34. Thus, by operating the buttons 30, the lamp 15 can be lighted and extinguished at will. The signal circuits include a conductor 36 connected with the switch 23 and connected by a branch conductor 37 with one terminal of the lamp 14, by a conductor 38 with one terminal of the right hand lamp 16, and by another branch 39 with one terminal of the left hand lamp 16. The other terminal of the lamp 14 is connected by a conductor 40 with the contact strip 27, the other terminal of the right hand lamp 16 is connected by a conductor 41 with the right hand contact strip 25, while the other terminal of the left hand lamp 16 is connected by a conductor 42 with the left hand contact strip 25.

When the vehicle is in operation, the contact 26 is normally between and out of engagement with the contact strips 25, and the contact 28 is normally moved out of engagement with the strip 27, thus opening the circuits of the lamps 14 and 16. By operating the buttons 29, the circuits of lamps 14 and 16 can be opened and closed at will, and the connection between the conductors 31 and 36 must be made before the lamps 14 and 16 will be lighted. If the vehicle is steered to the right, the contact 26 moves into engagement with the right hand strip 25, thus closing the circuit through the right hand lamp 16. This circuit includes the battery 24, conductor 31, switch 23, conductor 36, branch 38, right hand lamp 16, conductor 41, right hand strip 25, contact 26 and conductor 32. Similarly, when the vehicle is being turned to the left, the contact 26 engages the left hand strip 25, thus lighting the left hand lamp 16, the circuit including the battery 24, conductor 31, switch 23, conductor 36, branch 39, left hand lamp 16, conductor 42, left hand strip 25, contact 26 and conductor 32. This will signal to others the fact that the vehicle is turning or is about to turn to the left. When the vehicle is to be or is being stopped, the contact 28 moves into engagement with the strip 27, closing a circuit including the battery 24, conductor 31, switch 23, conductor 36, branch 37, lamp 14, conductor 40, strip 27, contact 28 and conductor 33.

The controlling switch 22 includes a pair of disks 43 and 44 placed face to face in contact with each other, said disks being constructed of wood, fiber or other suitable insulating material. The contact and contact strip 27 are embedded in the contacting faces of the disks 43 and 44, the disk 43 being stationary while the disk 44 is rotatable to move the contact into and out of engagement with the strip, as will be apparent from the foregoing. Suitable binding posts 44' are carried by the remote faces of the disks and are connected to the contact and to the strip for the attachment of the conductors. In order to support the stationary disk 43, a bar 45, providing a bracket, extends diametrically across the outside face thereof and is secured thereto by means of screws 46 or otherwise. The bar 45 extends radially from the disk 43 and is bent angularly, as at 47, to be bolted to a suitable support. As a means for turning the disk 44, a bar 48, providing a lever, extends diametrically across the outside face of the disk 44 and is secured thereto by screws 49 or otherwise. The bar or lever 48 can be operated manually or mechanically for turning the disk 44 to open and close the circuit. The disks 43 and 44 are rotatably connected by means of a pivot bolt or pin 50 extending through the centers thereof and through the bars 45 and 48, said bolt having a head at one end bearing against the bar 48, and having a nut 51 threaded thereon at its other end spaced from the disk 43. A coiled wire expansion spring 52 is disposed upon the bolt between the nut 51 and a washer 53 bearing against the bar 45, thereby tending to draw the bolt 50 through the disk 43 to hold the disk 44 under spring tension against the disk 43, whereby the contact members will be pressed against one another properly.

The bar or lever 48 of each switch can be operated automatically by connecting it to a suitable controlling member of a vehicle. Thus, a rod or link 54 is pivoted at one end to the lever 48, and its other end is connected by a clamp 55 with a movable part of the vehicle. Said clamp 55 has the terminals 56 connected by a clamping bolt 57 to hold the clamp in place, one terminal being extended and having the corresponding end of the rod or link 54 engaged therethrough, as at 58. The clamp 55 can be readily applied for pivotally connecting the link 54 to the desired part of the vehicle. Thus, in an automobile, the clamp 55 of the controlling switch 32 can be applied to the brake pedal 59, in order that when the same is operated to apply the brakes, the switch 22 will be operated for closing the corresponding circuit. In the same manner, the clamp 55 of the switch 21 can be applied to an oscillating arm or other part 60 of the steering gear, so that the contact 26 will be moved into engagement with the strips 25 as the machine is steered toward the right or the left. The switch 21 is similar to the switch 22, but in the switch 21 there are, however, two contact strips 25, as above indicated, instead of the single contact strip 27 of switch 22. Further, there is in the switch 21 an additional binding post 44' for the additional contact strip. The contact 26 of the switch 21 is the same as the contact 28 of the switch 22.

Having thus described the invention, what is claimed as new is:

A switch embodying two disks of insulating material disposed face to face against each other, contact members embedded in the adjacent faces of the disks, bars extending across the outer faces of the disks, one for supporting them, and the other for rotating the disks relatively, a pivot extending through the disks and bars for pivotally connecting them, and spring means between the pivot and one bar for pressing the disks together.

In testimony that I claim the foregoing as my own, I have hereto affixed my signature in the presence of two witnesses.

VARR M. GRUMMONS.

Witnesses:
  W. A. PERRY,
  EMIL I. GRUMMONS.